(12) United States Patent
Read

(10) Patent No.: US 11,820,715 B2
(45) Date of Patent: Nov. 21, 2023

(54) POROUS SPACE FILLERS FOR CERAMIC MATRIX COMPOSITES

(71) Applicant: RAYTHEON TECHNOLOGIES CORPORATION, Farmington, CT (US)

(72) Inventor: Kathryn S. Read, Marlborough, CT (US)

(73) Assignee: RTX Corporation, Farmington, CT (US)

( * ) Notice: Subject to any disclaimer, the term of this patent is extended or adjusted under 35 U.S.C. 154(b) by 46 days.

(21) Appl. No.: 17/239,310

(22) Filed: Apr. 23, 2021

(65) Prior Publication Data

US 2021/0239008 A1 Aug. 5, 2021

Related U.S. Application Data

(62) Division of application No. 16/028,970, filed on Jul. 6, 2018, now Pat. No. 11,015,467.

(51) Int. Cl.
*B33Y 10/00* (2015.01)
*C04B 35/565* (2006.01)
*B33Y 80/00* (2015.01)
*B28B 1/00* (2006.01)
*F01D 5/18* (2006.01)
(Continued)

(52) U.S. Cl.
CPC ............ *C04B 35/565* (2013.01); *B28B 1/001* (2013.01); *B33Y 10/00* (2014.12); *B33Y 40/20* (2020.01); *B33Y 80/00* (2014.12); *C04B 35/111* (2013.01); *C04B 35/48* (2013.01); *C04B 35/80* (2013.01); *C04B 38/08* (2013.01); *F01D 5/186* (2013.01); *F01D 9/041* (2013.01); *F01D 25/12* (2013.01); *F05D 2220/32* (2013.01); *F05D 2230/20* (2013.01); *F05D 2240/12* (2013.01); *F05D 2240/301* (2013.01); *F05D 2240/55* (2013.01); *F05D 2300/2112* (2013.01); *F05D 2300/2118* (2013.01); *F05D 2300/2261* (2013.01); *F05D 2300/6033* (2013.01)

(58) Field of Classification Search
None
See application file for complete search history.

(56) References Cited

U.S. PATENT DOCUMENTS 9,410,437 B2   8/2016   Paige et al.
9,695,089 B2   7/2017   Lynen et al.
(Continued)

FOREIGN PATENT DOCUMENTS

CN   107200600   9/2017
EP   3075531    10/2016

OTHER PUBLICATIONS

European Patent Office, European Search Report dated Nov. 26, 2019 in Application No. 19184269.9.
(Continued)

*Primary Examiner* — Mohammad M Ameen
(74) *Attorney, Agent, or Firm* — SNELL & WILMER L.L.P.

(57) ABSTRACT

A space filler for forming a fibrous preform may comprise an additively manufactured ceramic material. The additively manufactured ceramic material may define a plurality of pores. A shape of the additively manufactured ceramic material may complement a shape of a void formed by fibrous regions of the fibrous preform.

7 Claims, 6 Drawing Sheets

(51) Int. Cl.
    *F01D 9/04*     (2006.01)
    *F01D 25/12*     (2006.01)
    *C04B 35/111*     (2006.01)
    *C04B 35/48*     (2006.01)
    *C04B 35/80*     (2006.01)
    *C04B 38/08*     (2006.01)
    *B33Y 40/20*     (2020.01)

(56) References Cited

U.S. PATENT DOCUMENTS

| | | |
|---|---|---|
| 2013/0251939 A1 | 9/2013 | Kleinow |
| 2014/0271153 A1* | 9/2014 | Uskert .................. F01D 5/187 |
| | | 415/177 |
| 2014/0311163 A1 | 10/2014 | Uskert et al. |
| 2015/0251941 A1 | 9/2015 | Clark |
| 2016/0356499 A1 | 12/2016 | Freeman et al. |
| 2017/0087631 A1 | 3/2017 | Gold |
| 2017/0233300 A1 | 8/2017 | Raj |
| 2017/0328223 A1 | 11/2017 | Subramanian et al. |
| 2018/0045063 A1* | 2/2018 | Frey ........................ C04B 35/80 |
| 2018/0065337 A1* | 3/2018 | Grasso .................... B32B 15/04 |
| 2018/0119549 A1 | 5/2018 | Vetters et al. |
| 2018/0230064 A1* | 8/2018 | Lamusga ............ C04B 41/5096 |

OTHER PUBLICATIONS

USPTO, Restriction/Election Requirement dated Dec. 12, 2019 in U.S. Appl. No. 16/028,970.
USPTO, Pre-Interview First Office Action dated Apr. 16, 2020 in U.S. Appl. No. 16/028,970.
USPTO, First Action Interview Office Action dated Jul. 7, 2020 in U.S. Appl. No. 16/028,970.
USPTO, Final Office Action dated Oct. 14, 2020 in U.S. Appl. No. 16/028,970.
USPTO, Advisory Action dated Jan. 4, 2021 in U.S. Appl. No. 16/028,970.
USPTO, Notice of Allowance dated Jan. 28, 2021 in U.S. Appl. No. 16/028,970.
European Patent Office, European Office Action dated Mar. 1, 2021 in Application No. 19184269.9.
USPTO, Corrected Notice of Allowance dated Mar. 24, 2021 in U.S. Appl. No. 16/028,970.

* cited by examiner

POROUS SPACE FILLERS FOR CERAMIC MATRIX COMPOSITES

CROSS-REFERENCE TO RELATED APPLICATIONS

This application is a divisional of, and claims priority to and the benefit of, U.S. application Ser. No. 16/028,970, filed Jul. 6, 2018 and entitled "POROUS SPACE FILLERS FOR CERAMIC MATRIX COMPOSITES," which is incorporated by reference herein in its entirety for all purposes.

FIELD

The present disclosure relates to additively manufactured components, and, more specifically, to additively manufactured space fillers for ceramic matrix composite components.

BACKGROUND

A gas turbine engine typically includes a fan section, a compressor section, a combustor section, and a turbine section. Various components of the gas turbine engine may comprise a ceramic matrix composite (CMC). Forming complex geometries using CMC can lead to spaces between regions or plies of the CMC preforms. Space fillers, sometimes referred to as "noodles," may be utilized to fill theses spaces and maintain the preform shape. However, regions of CMCs in which space fillers are present tend to be thicker than the adjacent areas making densification more challenging. For example, space fillers are frequently fabricated from tow, and the fiber packing arrangement of the tow is different than the surrounding plies.

SUMMARY

A space filler for forming a fibrous preform is disclosed herein. In accordance with various embodiments, the space filler may comprise a ceramic material defining a plurality of pores. The ceramic material may be formed by additive manufacturing. A shape of the ceramic material may complement a shape of a void formed in a fibrous region of the fibrous preform.

In various embodiments, a first volume of the ceramic material at an end of the space filler may be less than a second volume of the ceramic material at an interior section of the space filler. The interior section of the space filler may correspond to an interior portion of the fibrous preform.

In various embodiments, the plurality of pores may form a plurality of interconnected channels through the ceramic material. In various embodiments, the ceramic material may form a generally triangular prism.

In various embodiments, the space filler may further comprise a first end having a first height, and a second end having a second height less than the first height. In various embodiments, the space filler may further comprise an interior section having a first height that is less than a second height of an end of the space filler. In various embodiments, the space filler may further comprise a concave surface.

A ceramic matrix composite component for a gas turbine engine is also disclosed herein. In accordance with various embodiments, the ceramic matrix composite component may comprise a first fibrous region, a second fibrous region adjacent to the first fibrous region, and a space filler disposed in a void defined, at least partially, by the first fibrous region and the second fibrous region. The space filler may comprise a ceramic material formed by additive manufacturing. The ceramic material may define a plurality of pores.

In various embodiments, a diameter of a first pore of the plurality of pores may be greater than a diameter of a second pore of the plurality of pores. The first pore may be located proximate an end of the space filler. The second pore may be located proximate an interior of the space filler. In various embodiments, the plurality of pores may form a plurality of interconnected channels configured to direct a gas flow to the first fibrous region and the second fibrous region.

In various embodiments, the ceramic matrix composite component may comprise an airfoil. The space filler may be located proximate at least one of a trailing edge, a rib, or a root of the airfoil.

In various embodiments, the ceramic matrix composite component may comprise a blade outer air seal. The space filler may be located proximate at least one of a leading edge rail or a trailing edge rail of the blade outer air seal.

A method of making ceramic matrix composite component is also disclosed herein. In accordance with various embodiments, the method may comprise forming a space filler comprising a ceramic material using an additive manufacturing technique, forming a fibrous preform comprising a lay-up of fibrous regions disposed around the space filler, and densifying the fibrous preform.

In various embodiments, the step of forming the space filler may comprise forming a plurality of interconnected channels through the space filler. In various embodiments, the ceramic material may define a plurality of pores in the space filler.

In various embodiments, the step of forming the space filler may comprise forming at least one of a greater density of the ceramic material or a greater volume of the ceramic material proximate an interior of the space filler as compared to an end of the space filler. In various embodiments, the step of forming the space filler may comprise configuring the space filler to fill a void defined by adjacent fibrous regions of the lay-up.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
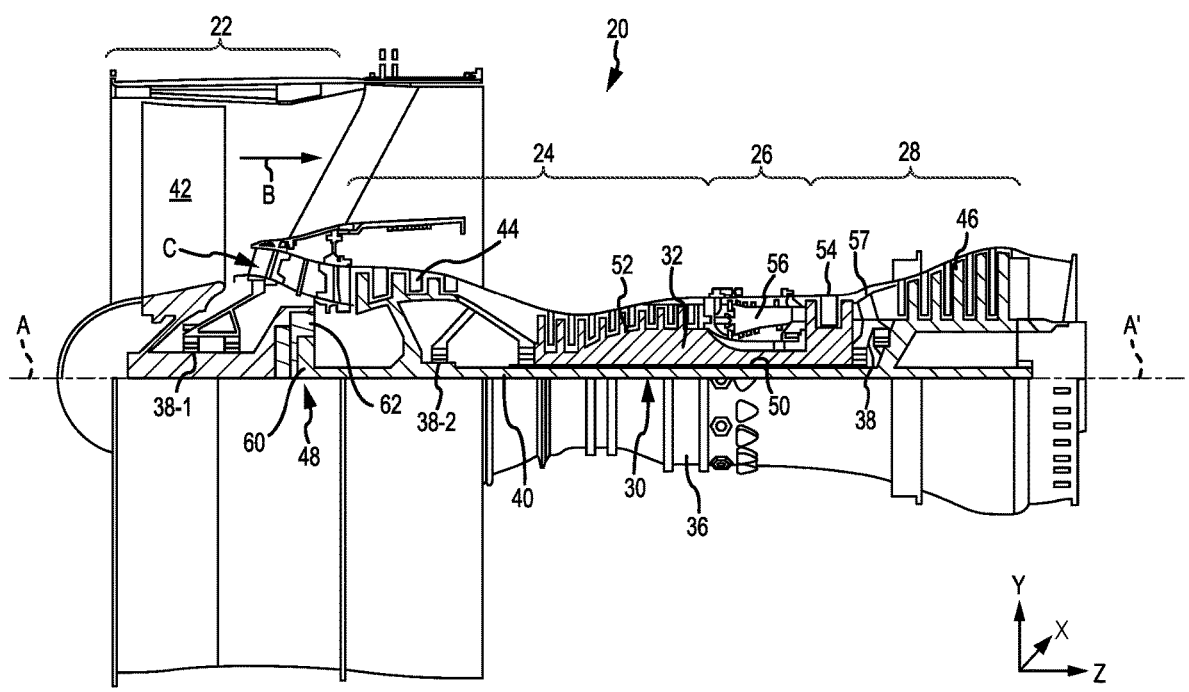
FIG. 1 illustrates a cross-sectional view of an exemplary gas turbine engine, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not be necessarily be repeated herein for the sake of clarity.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

As used herein, the term "additive manufacturing" encompasses any method or process whereby a three-dimensional object is produced by creation of a substrate or material, such as by addition of successive layers of a material to an object to produce a manufactured product that has an increased mass or bulk at the end of the additive manufacturing process as compared to the beginning of the process. In contrast, traditional (i.e., non-additive) manufacturing by machining or tooling typically relies on material removal or subtractive processes, such as cutting, machining, extruding, lathing, drilling, grinding, stamping, and/or the like, to produce a final manufactured object that has a decreased mass or bulk relative to the starting workpiece. Other traditional, non-additive manufacturing methods include forging or casting, such as investment casting, which utilizes the steps of creating a form, making a mold of the form, and casting or forging a material (such as metal) using the mold. Non-additive manufacturing methods also include weaving, needling, knitting, braiding, or the like. As used herein, the term "additive manufacturing" should not be construed to encompass a joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A'-A relative to an engine static structure 36 or engine case via several bearing systems 38, 38-1, and 38-2. Engine central longitudinal axis A'-A is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A'-A, which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Gas turbine engine 20 may include one or more CMC components. For example, fan section 22, compressor section 24, and turbine section 28 may each comprise one or more stages or sets of rotating blade assemblies and one or more stages or sets of stationary vane assemblies axially interspersed with the associated blade stages but non-rotating about engine central longitudinal axis A-A'. In various embodiments, the blade and/or vane assemblies in fan section 22, compressor section 24, and/or turbine section 28 may comprise a CMC component. For example, in various embodiments, an airfoil of the blade or vane assembly may be formed from CMC. In various embodiments, combustor 56 may include one or more CMC component(s). For example, combustor shells, heat shield panel, and/or liners may be formed from CMC.

CMC components of the present disclosure may include space fillers formed from additively manufactured ceramic, for example, from silicon carbide (SiC), aluminum oxide ($Al_2O_3$), zirconium dioxide ($ZrO_2$) or the like. Additive manufacturing may allow the space fillers to be formed having more complex geometries. The complex geometries of additively manufactured space fillers may reduce occurrences of wrinkles in adjacent fibrous plies and/or of voids between the space filler and the fibrous regions adjacent the space filler. Additively manufacturing the space filler may also provide for formation of more controlled and/or complex pores structures within the space filler. In this regard, additive manufacturing allows the size, shape, location, and distribution of the pores to be controlled. In various embodiments, the pores may form interconnected channels designed to control gas flow through the space filler. The distribution and location of the pores may be designed to optimize gas flow and densification of the component during a chemical vapor infiltration (CVI) process. Improved component densification may improve the interlaminar and thermal properties of the CMC.

Additionally, a space filler having predetermined characteristics, such as a predetermined areal weight, ceramic volume, and ceramic density at various points in the space may be beneficial. As will be discussed in greater detail, forming a space filler using additive manufacturing methods such as three-dimensional polymeric printing may provide the ability to vary one or more of these characteristics.

Figure 2A:
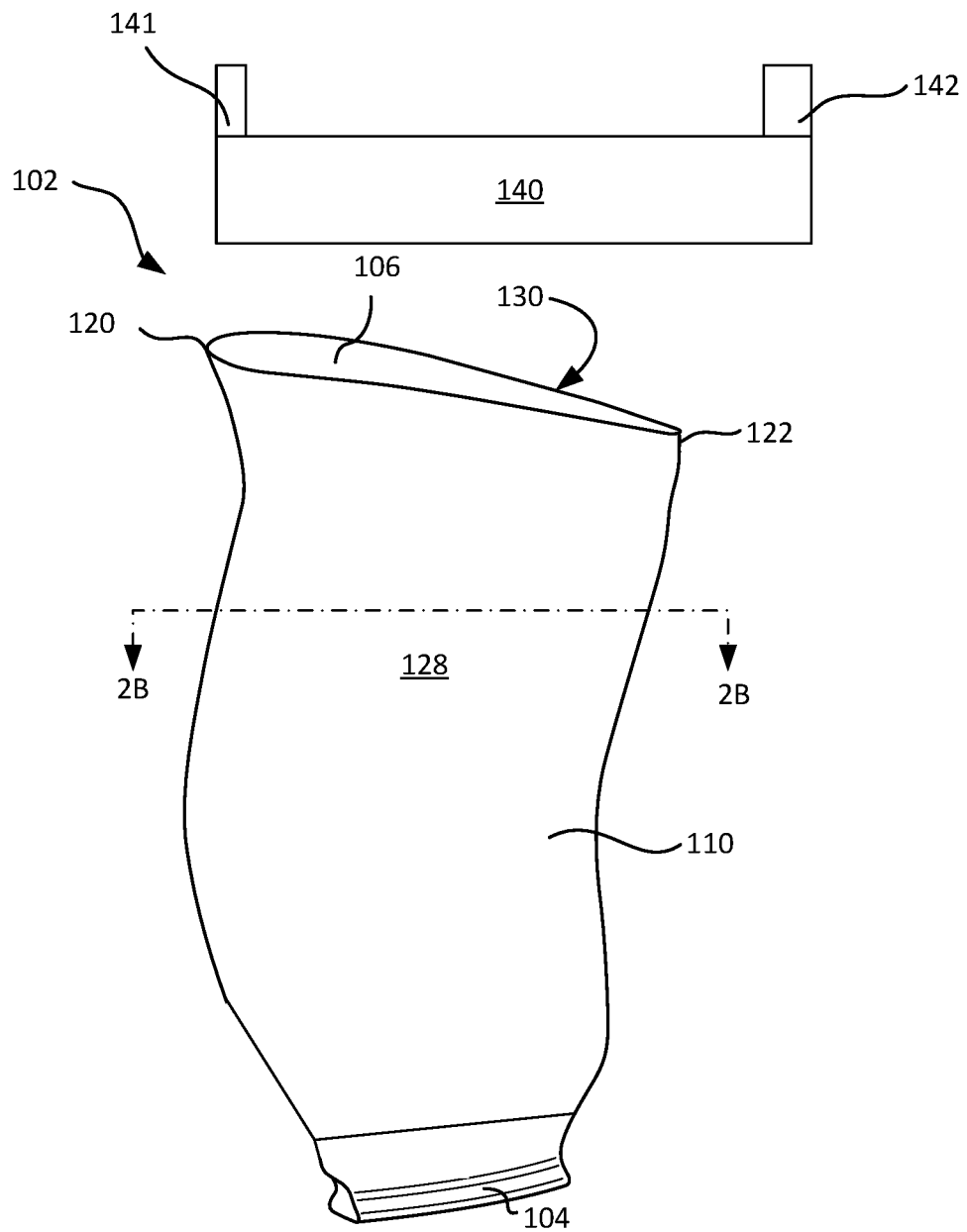
FIGS. 2A and 2B illustrate, respectively, a perspective view and a cross-sectional view of an exemplary airfoil, in accordance with various embodiments.

With reference to FIG. 2A, an airfoil 102 is illustrated, in accordance with various embodiments. Airfoil 102 may include a body 110 having a leading edge 120 and a trailing edge 122. Leading edge 120 and trailing edge 122 may extend from a radially inward root 104 of airfoil 102 to a radially outward tip 106 of airfoil 102. Airfoil 102 may further include a generally concave pressure side surface 128 and a generally convex suction side surface 130 joined together at the respective leading edge 120 and trailing edge 122. In various embodiments, air foil may comprise a blade configured to rotate relative to the engine central longitudinal axis. In various embodiments, a blade outer air seal 140 may be disposed radially outward of airfoil 102. In various embodiments, blade outer air seal 140 may comprise a CMC component. Stated differently, blade outer air seal 140 may be formed from CMC.

Figure 2B:
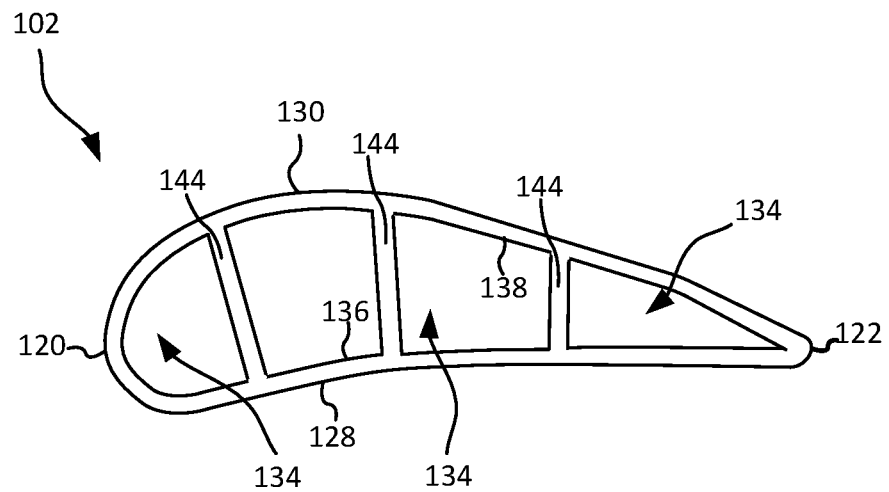

With reference to FIG. 2B, a cross-sectional view of airfoil 102 taken along the line 2B-2B in FIG. 2A is illustrated, in accordance with various embodiments. In various embodiments, airfoil 102 may include one or more cavities 134. Cavities 134 may be defined, at least partially, by an interior pressure side surface 136 and an interior suction side surface 138 of airfoil 102. Interior pressure side surface 136 is oriented generally opposite, or away from, pressure side surface 128. Interior suction side surface 138 is oriented generally opposite, or away from, suction side surface 130. Stated differently, a pressure side wall of airfoil 102 includes pressure side surface 128 and interior pressure side surface 136, and a suction side wall of airfoil 102 includes suction side surface 130 and interior suction side surface 138.

Airfoil 102 may further include a plurality of ribs 144 extending between interior pressure side surface 136 and interior suction side surface 138. Cavities 134 may be defined, at least partially, by ribs 144. While ribs 144 are illustrated as extending from interior pressure side surface 136 to interior suction side surface 138, it is further contemplated and understood that one or more ribs 144 may terminate prior to interior pressure side surface 136 or interior suction side surface 138.

Figure 3:
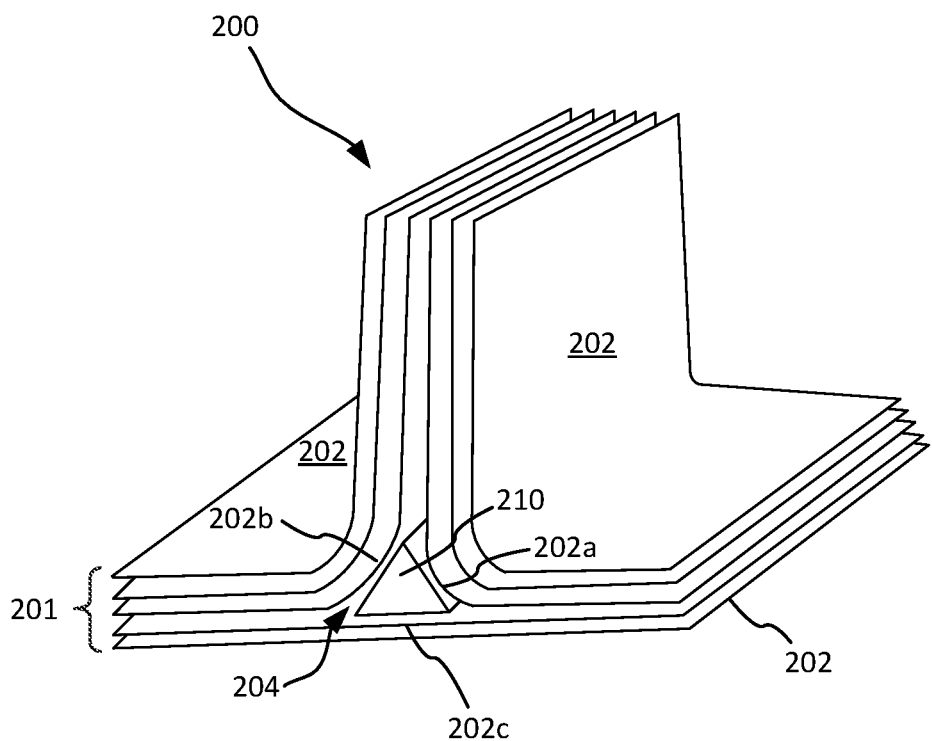
FIG. 3 illustrates a fibrous preform having an additively manufactured space filler, in accordance with various embodiments.

Referring FIG. 3, a fibrous preform 200 for forming a CMC structure is illustrated in accordance with various embodiments. Fibrous preform 200 may comprise fibrous regions 202 having woven, braided, knitted, and/or 3D printed fibers (e.g., carbon fibers, SiC fibers, etc.) In various embodiments, fibrous regions 202 may be individual textile layers (or plies) and fibrous preform 200 may comprise a lay-up 201 formed by needling the individual textile layers (i.e., fibrous regions 202). In various embodiments, 3D printing, or 3D weaving may be used to form lay-up 201 and fibrous regions 202.

Fibrous preform 200 comprises a porous structure. A chemical vapor infiltration or deposition ("CVI/CVD") process may be used to form a ceramic, for example, a SiC, matrix on and around the fibers of the preform 200 and the space filler 210. The CVI/CVD process may involve deposition of a matrix of SiC, carbon, $B_4C$, and/or $Si_3N_4$. In that regard, the pores of fibrous preform 200 and space filler 210 may be infiltrated with SiC, or other ceramic material, to form a densified fibrous structure (i.e., a CMC component). Selection of matrix material or materials may depend on the necessary properties, such as heat capacity, wear resistance, and/or oxidation resistance, of final CMC component.

With combined reference to FIG. 3 and FIGS. 2A and 2B, prior to the densification process, fibrous preform 200 may be formed into any desired shape or form. In various embodiments, fibrous regions 202 of fibrous preform 200 may be shaped to form the structures of, for example, body 110 and ribs 144 of airfoil 102. Shaping fibrous regions 202 to form ribs 144 extending from interior pressure side surface 136 may generate a void 204 between adjacent fibrous regions 202. Stated differently, bending, angling, or curving, a portion of fibrous preform 200 may create a void 204 between adjacent fibrous regions 202 at the location of the bend, angle, or curve. Stated yet another way, void 204 may be located where the shape of a first fibrous region 202a varies from the shape of adjacent fibrous regions 202b and 202c. In various embodiments, shaping fibrous preform 200 to form root 104 may cause a void to be formed in fibrous regions 202 at root 104 of airfoil 102. In various embodiments, fibrous preform 200 may be shaped to form the structures of BOAS 140 and void 204 may be proximate a leading edge rail 141 and/or trailing edge rail 142 of BOAS 140.

In various embodiments, a space filler, or "noodle", 210 may be located in void 204. In various embodiments, space filler 210 may be located in void 204 after fibrous preform 200 is shaped. In this regard, fibrous regions 202 may be woven, threaded, 3D printed, or otherwise formed and then space filler 210 is place in void 204. In various embodiments, fibrous preform 200 may shaped around space filler 210. In this regard, space filler 210 may be formed then fibrous regions 202 may be woven, threaded, 3D printed, or otherwise formed around space filler 210 to form the shape of fibrous preform.

In various embodiments, space filler 210 is formed using an additive manufacturing technique. Employing additive manufacturing techniques to form space filler 210 may allow for space filler geometries and pore structures that may not otherwise be possible with other manufacturing processes. For example, void 204 may comprise a triangular prism or other complex shape (e.g., a shape having one or more curved surfaces or surfaces oriented at varying angles, and/or combinations of curved and angled surfaces), which generally cannot be formed by traditional tow bundles. Additively manufacturing space filler 210 may allow the shape of space filler 210 to complement or match the shape of void 204.

Figure 4:
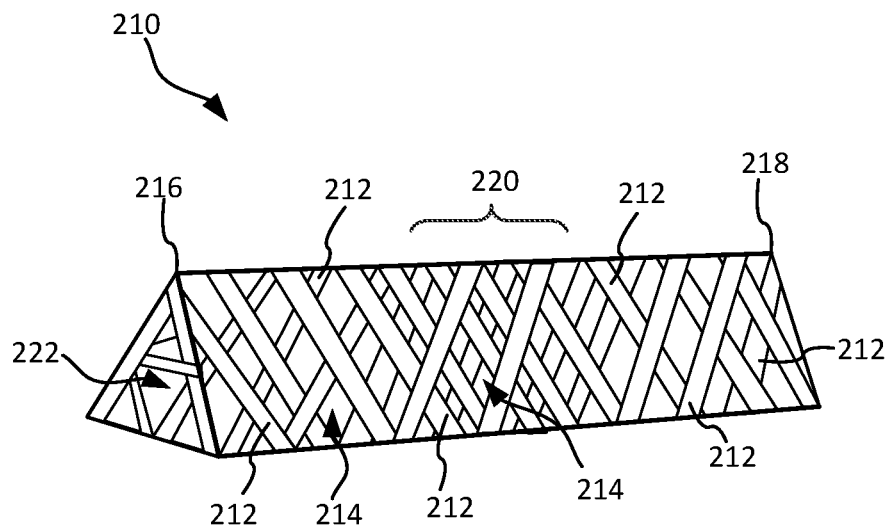
FIG. 4 illustrates an additively manufactured space filler with variably sized pores for forming a CMC component, in accordance with various embodiments.

With reference to FIG. 4, a perspective view of space filler 210 is illustrated, in accordance with various embodiments. Space filler 210 may comprise an additively manufactured (e.g., 3-D printed) ceramic material 212. Ceramic material 212 may comprise SiC, $Al_2O_3$, $ZrO_2$, or the like. In various embodiments, space filler 210 may comprise a generally triangular prism shaped structure. In this regard, ceramic material 212 may form a generally triangular prism. While space filler 210 is illustrated as having triangular prism shape, it further contemplated and understood that space filler 210 may be additively manufactured to have any shape and/or to match the shape of any void between fibrous regions.

Space filler 210 may be a porous structure. Ceramic material 212 may define a plurality of pores 214 (i.e., areas which are devoid of ceramic material 212) located throughout space filler 210. In various embodiments, the number and/or size of pores 214 may vary along space filler 210. For example, in various embodiments, ends 216 and 218 of space filler 210 may comprise pores have a greater diameter as compared to pores in a middle, or interior, section 220 of space filler. Stated differently, a density (or volume) of ceramic material 212 may be greater in interior section 220, as compared to a density (or volume) of ceramic material 212 at ends 216 and 218. As used herein, "volume" refers to the percentage or fraction of a specified volume within a specific portion or segment of a space filler that is occupied by ceramic. As used herein, "density" refers to the mass of ceramic contained in a specified volume within a specific portion or segment of a space filler.

Interior section 220 may be located proximate to a midpoint between end 216 and end 218. A location of interior section 220, and thus the location of space filler 210 that has an increased density and/or increased volume of ceramic material 221, may correspond to an interior portion, or a portion generally distal to the exterior surfaces, of fibrous preform 200, with momentary reference to FIG. 3. The increased pore volume at the ends 216 and 218 may increase gas flow to the interior section 220 and to interior areas of fibrous preform 200, with momentary reference to FIG. 3, during the densification process (e.g., during CVI/CVD).

In various embodiments, ceramic material 212 may define a plurality of interconnected channels 222 through space filler 210. Stated differently, one or more pores 214 may be fluidly connected to form channels 222 through space filler 210. Channels 222 may be designed to direct gas flow during the densification process. In various embodiments, pores 214 and/or channels 222 have diameters ranging between 0.0003 inches and 0.008 inches (between 7.6 and 203.2 micrometers). In various embodiments, pores 214 and/or channels 222 have diameters ranging between 0.0004 inches and 0.006 inches (between 10.0 and 152.4 micrometers). In various embodiments, pores 214 and channels 222 have diameters ranging between 0.001 inches and 0.003 inches (between 25.4 and 76.2 micrometers).

Figure 5:
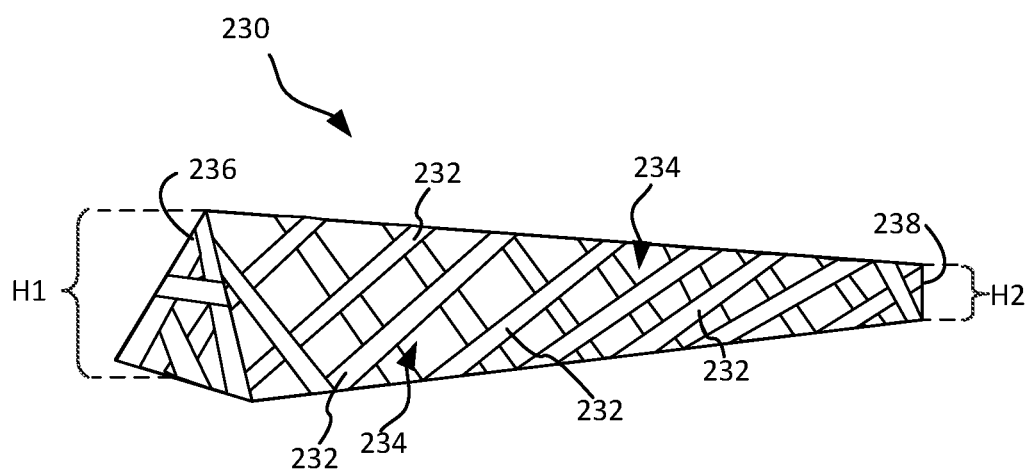
FIG. 5 illustrates an additively manufactured space filler with a tapered geometry for forming a CMC component, in accordance with various embodiments.

With reference to FIG. 5, a perspective view of a space filler 230 is illustrated, in accordance with various embodiments. In various embodiments, space filler 230 is formed using an additive manufacturing technique. Space filler 230 may comprise an additively manufactured (e.g., 3-D printed) ceramic material 232. Space filler 230 may be a porous structure. Ceramic material 232 may define a plurality of pores 234 (i.e., areas devoid of ceramic material 232) located throughout space filler 230. Space filler 230 may comprise a generally tapered triangular prism shaped structure. In this regard, ceramic material 212 may form a tapered triangular prism. A height H1 of space filler 230 at end 236 may be greater than a height H2 of space filler at end 238. Fibrous regions 202, with momentary reference to FIG. 3, may be located around space filler 230 to form the fibrous preform of a CMC component. Space filler 230 may be configured to shape an angled, curved, or other complex geometry portion of a CMC component. In this regard, the shape of space filler 230 may be configured to complement a void between adjacent fibrous regions the CMC component.

Figure 6:
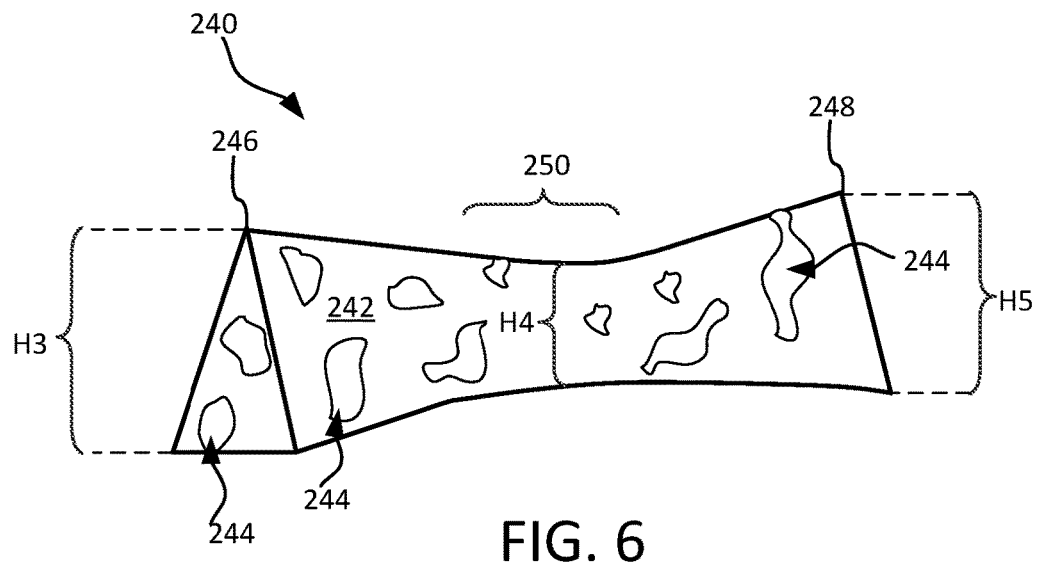
FIG. 6 illustrates an additively manufactured space filler with varying height for a forming CMC component, in accordance with various embodiments.

With reference to FIG. 6, a perspective view of a space filler 240 is illustrated, in accordance with various embodiments. Fibrous regions 202, with momentary reference to FIG. 3, may be located around space filler 240 to form the fibrous preform of a CMC component. In various embodiments, space filler 240 is formed using an additive manufacturing technique. In various embodiments, space filler 240 may comprise a generally triangular prism shaped structure of varying height. In this regard, a height H3 of space filler 240 at an end 246 may be greater than a height H4 of space filler 240 in an interior section 250, and a height H5 of space filler 240 at an end 248 may be greater than height H4 at interior section 250. Space filler 240 may comprise an additively manufactured (e.g., 3-D printed) ceramic material 242. Space filler 240 may be a porous structure. In this regard, ceramic material 242 may define a plurality of pores 244 (i.e., areas devoid of ceramic material 242) located throughout space filler 240. Pores 244 may be formed having any shape. The shape and size of pores 244 may be determined based on the desired gas flow during the densification process. Space filler 240 may be configured to shape an angled, curved, or other complex geometry portion of a CMC component. In this regard, the shape of space filler 240 may be configured to complement a void between adjacent fibrous regions of the CMC component.

Figure 7A:
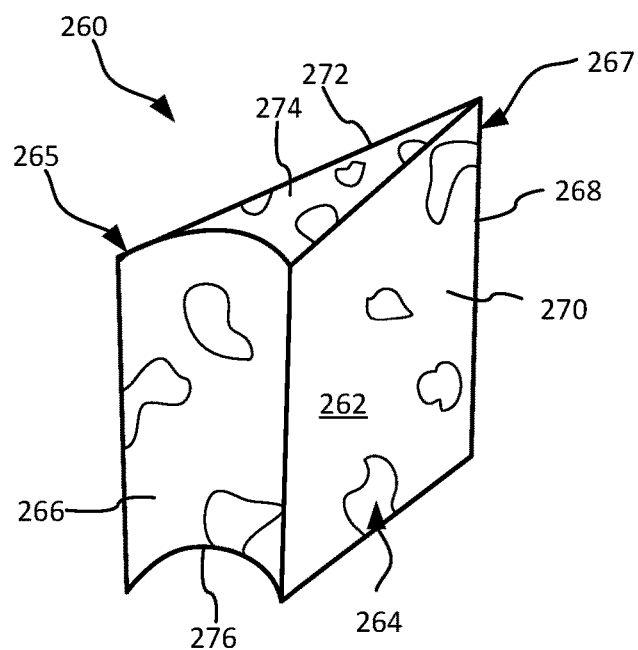
FIGS. 7A and 7B illustrate, respectively, a perspective view and a plan view of an additively manufactured space filler for forming a CMC component, in accordance with various embodiments.
Figure 7B:
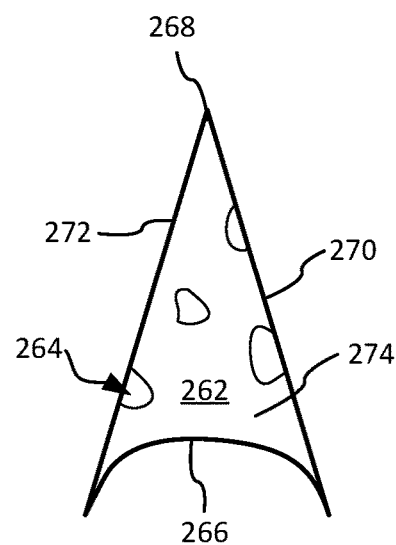

With reference to FIGS. 7A and 7B, a perspective view and a plan view, respectively, of a space filler 260 is illustrated, in accordance with various embodiments. Fibrous regions, similar to fibrous regions 202 in FIG. 3, may be located around space filler 260 to form the fibrous preform of a CMC component. In various embodiments, space filler 260 may be employed to form trailing edge 122 of airfoil 102, with momentary reference to FIG. 2B. In various embodiments, space filler 260 is formed using an additive manufacturing technique. Space filler 260 may be a porous structure. In this regard, a ceramic material 262 may define a plurality of pores 264 (i.e., areas devoid of ceramic material 262) located throughout space filler 260. Pores 264 may be configured to optimize gas flow between fibrous regions of the preform during the densification process. In various embodiments, a first end 265 of space filler 260 may comprise a curved surface 266. In various embodiments, curved surface 266 may comprise a concave curve. A second end 267 of space filler 260, opposite first end 265, may be pointed or form an apex 268 of space filler 260. Space filler 260 may comprise two generally rectangular-shaped surfaces 270 and 272 extending from apex 268 to curved surface 266. Space filler 260 may further comprise two generally triangular-shaped surfaces 274 and 276 extending from apex 268 to curved surface 266 and between rectangular-shaped surfaces 270 and 272. Space filler 260 may be configured to shape an angled, curved, or other complex geometry portion of a CMC component. In this regard, the shape of space filler 260 may be configured to complement a void between adjacent fibrous regions the CMC component.

Figure 8:
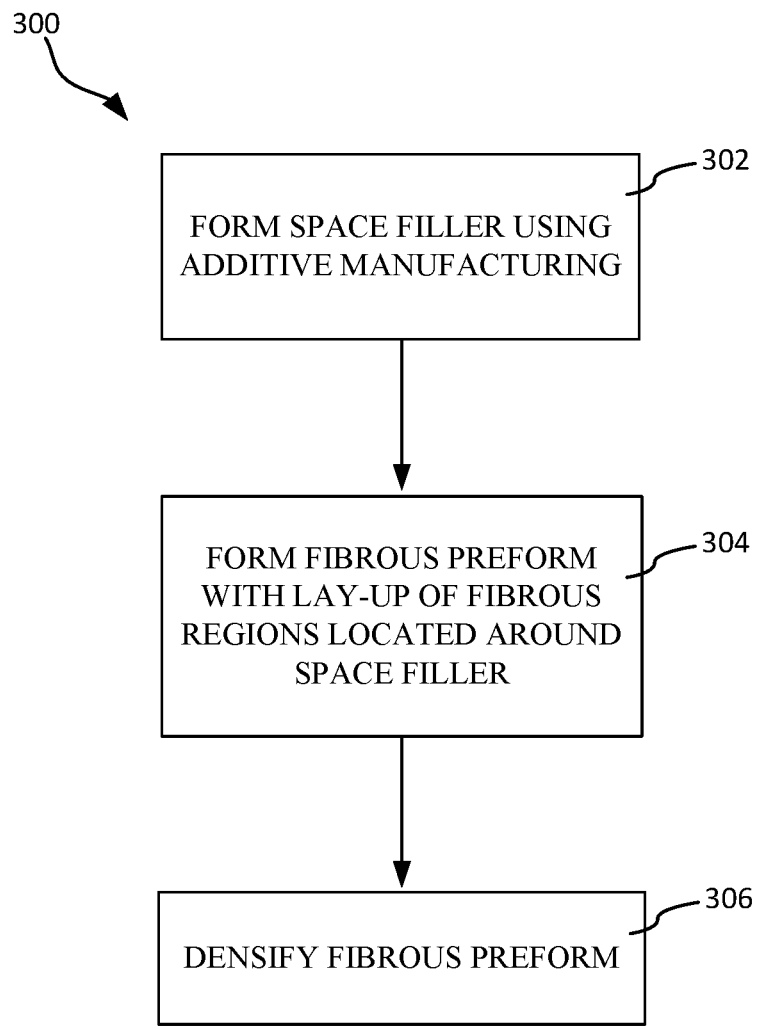
FIG. 8 illustrates a method of making a CMC component using an additively manufactured space filler, in accordance with various embodiments.

Referring to FIG. 8, a method 300 of making a CMC component is illustrated, in accordance with various embodiments. Method 300 may comprise forming a space filler using an additive manufacturing technique (step 302), forming a fibrous preform comprising a lay-up of fibrous regions located around the space filler (step 304), and densifying the fibrous preform (step 306).

In various embodiments, step 302 may include forming a plurality of interconnected channels through the space filler. Step 302 may including forming at least one of a greater density or a greater volume of the ceramic material proximate an interior of the space filler as compared to an end of the space filler. Step 302 may include configuring the space filler to fill a void defined by adjacent fibrous regions of the lay-up.

With combined reference to FIG. 3, FIG. 4, and FIG. 8, in various embodiments, step 302 may comprise forming space filler 210 comprising ceramic material 212 using an additive manufacturing technique. Step 304 may including forming fibrous preform 200 comprising a lay-up 201 of fibrous regions 202 disposed around space filler 210. Step 306 may include densifying fibrous preform 200.

In various embodiments, step 306 may include infiltration the fibrous preform using CVI/CVD to form a ceramic matrix. In various embodiments, step 302 may further include forming interconnected channels 222 through space filler 210. Step 302 also include forming a greater density or a greater volume of ceramic material 212 proximate an interior 220 of space filler 210 as compared to end 216 of space filler 210. Step 302 may also include configuring space filler 210 to fill void 204 defined by adjacent fibrous regions 202a, 202b, and 202c of lay-up 201. In various embodiments, an interface coating may be applied to fiberous preform 200 prior to the step 306.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic.

Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of making ceramic matrix composite component, comprising:
    forming a space filler comprising a ceramic material using an additive manufacturing technique, the space filler having a first end, a middle section, and a second end, wherein the forming the space filler further includes forming a first plurality of pores having a first diameter in the first end and a second plurality of pores having a second diameter in the middle section, the first diameter being greater than the second diameter;
    forming a fibrous preform comprising a lay-up of fibrous regions around the space filler, wherein the space filler is located in a void defined by the fibrous preform; and
    densifying the fibrous preform.

2. The method of claim 1, wherein forming the space filler comprises forming a plurality of interconnected channels through the space filler.

3. The method of claim 1, wherein forming the space filler comprises forming at least one of a greater density of the ceramic material or a greater volume of the ceramic material proximate an interior of the space filler as compared to an end of the space filler.

4. The method of claim 1, wherein forming the space filler comprises configuring the space filler to fill the void.

5. The method of claim 1, wherein forming the fibrous preform comprises shaping the fibrous regions, and wherein shaping the fibrous regions generates the void.

6. The method of claim 5, further comprising locating the space filler in the void after shaping the fibrous regions.

7. The method of claim 1, wherein forming the fibrous preform comprises at least one of weaving, threading, or 3D printing the fibrous regions around the space filler.

* * * * *